US009156471B2

United States Patent
Mayer et al.

(10) Patent No.: US 9,156,471 B2
(45) Date of Patent: Oct. 13, 2015

(54) PARENTAL CONTROL OF REAR SEAT HVAC UNIT IN VEHICLE

(71) Applicant: FORD GLOBAL TECHNOLOGIES, LLC, Dearborn, MI (US)

(72) Inventors: Walter Mayer, Bruehl (DE); Dietmar Fischer, Köln (DE); Markus Markowitz, Cologne (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 25 days.

(21) Appl. No.: 13/938,337

(22) Filed: Jul. 10, 2013

(65) Prior Publication Data
US 2014/0025261 A1    Jan. 23, 2014

(30) Foreign Application Priority Data

Jul. 19, 2012 (DE) .......................... 10 2012 212 723

(51) Int. Cl.
*B60W 30/00* (2006.01)
*B60W 10/30* (2006.01)
*B60H 1/00* (2006.01)

(52) U.S. Cl.
CPC ............. *B60W 30/00* (2013.01); *B60H 1/0065* (2013.01); *B60W 10/30* (2013.01)

(58) Field of Classification Search
CPC .... B60W 10/30; B60W 1/0065; B60W 30/00
USPC .............. 701/2, 24, 36, 48, 49; 307/9.1, 10.1, 307/10.2; 62/175, 178, 202–205
See application file for complete search history.

(56) References Cited

U.S. PATENT DOCUMENTS

| 4,091,866 | A  | * | 5/1978 | Curatolo ........................ 165/138 |
| 2003/0042793 | A1 | * | 3/2003 | Li ................... 307/10.1 |
| 2005/0093305 | A1 | * | 5/2005 | Jackson ........................ 292/216 |
| 2006/0181152 | A1 | * | 8/2006 | Taurasi ........................ 307/10.2 |
| 2009/0174682 | A1 | * | 7/2009 | Bowden et al. ............... 345/173 |
| 2012/0143410 | A1 | * | 6/2012 | Gallagher et al. .............. 701/22 |
| 2013/0282946 | A1 | * | 10/2013 | Ricci ............................. 710/306 |
| 2013/0297100 | A1 | * | 11/2013 | Petersen et al. ................... 701/2 |

FOREIGN PATENT DOCUMENTS

JP         10119542        5/1998

* cited by examiner

*Primary Examiner* — Rodney Butler
(74) *Attorney, Agent, or Firm* — Vichit Chea; MacMillan, Sobanski & Todd, LLC

(57) ABSTRACT

A vehicle has front and rear seats and an air conditioning system. There is an auxiliary control accessible from the rear seat for adjusting the air conditioning system. A rear entry door has a child locked state and a child unlocked state. There is a lock control element accessible from the front seat for setting the child locked state. The lock control element is coupled to the air conditioning system for selectably defeating the auxiliary control. Thus, the activation by a driver/parent of a rear-door child protection door lock system is also used for locking out child access to a rear air conditioning unit.

9 Claims, 2 Drawing Sheets

PARENTAL CONTROL OF REAR SEAT HVAC UNIT IN VEHICLE

CROSS REFERENCE TO RELATED APPLICATIONS

This application claims priority to application 102012212723.2, filed in the German Patent and Trademark Office on Jul. 19, 2012, which is hereby incorporated by reference.

STATEMENT REGARDING FEDERALLY SPONSORED RESEARCH

Not Applicable.

BACKGROUND OF THE INVENTION

The present invention relates in general to a master control for a climate control system with subordinate controls mounted in a rear seat area of a motor vehicle, in particular a passenger car, so that a driver or front seat passenger can selectively activate the rear seat controls.

In larger passenger vehicles such as vans and sport utility vehicles, separately controllable air conditioning units are often installed for the front and rear seating areas. Thus, the temperature and blower speed settings can be independently set. As disclosed in publication JP10119542A, separate control panels may be placed in the front and rear passenger areas to control the settings for their respective portions of the air conditioning system. Settings for the rear passenger area can be made from either the front or rear control panels. Furthermore, the front control panel acts as a master controller which can be used to make the rear control panel inactive.

In order to prevent the rear air conditioning system from being adjusted by playing children, there is usually a separate switch on the front operator control panel at the front air-conditioning unit for locking out or defeating the rear control panel, thereby switching it to a functionless state so that only the driver or other front seat passenger can control the rear seat settings.

This additional switch entails costs and requires space on the master front-seat control panel. This space is becoming ever more cramped, and the large number of operator control elements tends to cause confusion rather than providing a simple operating capability.

In contrast, the object of the invention is to make available a possible way of simplifying the parental control of the rear air-conditioning unit.

A "child lock" system is a conventional feature for rear entry doors in which the functionality of an inside door handle to open the door can be selectively prevented. This protects children riding in a rear seat area by ensuring that they cannot unsafely exit the vehicle even when the door is unlocked to be opened from the outside. Traditionally, a lever has been provided on the door for selectively making or breaking a link between a door latch and the inside door handle. More recently, electrically-powered child locks have been introduced so that the functionality of the inside handle on a rear entry door can be conveniently activated/deactivated from the front seating area by means of a toggle switch.

In Europe, a version of the electronically-controlled child lock system is commonly used which is referred to as a double lock system. A "double lock" state is set by sending a lock command to a latch that is already single locked. In a single locked state, the latch can be mechanically unlocked from the inside of the rear door allowing the inside handle to open the door. In the double locked state, the mechanical unlocking function of the inside handle is disabled just as it is in the child lock system employed in North America with a toggle switch. As used herein, "child lock" refers to either system.

SUMMARY OF THE INVENTION

In order to avoid the extra switch on the master control panel of the air conditioning unit and to simplify the operator control, it is proposed according to the invention that the activation/deactivation of a child lock system is also used to set the activation/deactivation of the rear seat controls for the air-conditioning unit.

More particularly, the operator control component of the rear air-conditioning unit is switched to a functionless state when the child protection means is activated, that is to say when a pushbutton toggle switch for the child lock function is activated. The locking or switching to a functionless state is preferably displayed on the front air-conditioning unit. The locking of the rear air-conditioning unit can also be displayed on the rear panel in an analogous fashion.

The activation of the child protection means, for example by the activation of the pushbutton key, preferably generates a signal which is transmitted to the rear is air-conditioning unit in order to trigger the lock. For this purpose, the signal can be transmitted via a dedicated line. However, it is also conceivable to use a conventional communication bus, for example a CAN bus or LIN bus, which is already deployed in the vehicle.

In one particular aspect of the invention, a vehicle having front and rear seats includes an air conditioning system with independent settings for the front and rear seats. There is an auxiliary control accessible from the rear seat for adjusting the air conditioning system. A rear entry door has a child locked state and a child unlocked state. There is a lock control element accessible from the front seat for setting the child locked state. The lock control element is coupled to the air conditioning system for selectably defeating the auxiliary control.

DETAILED DESCRIPTION OF PREFERRED EMBODIMENTS

Figure 1:
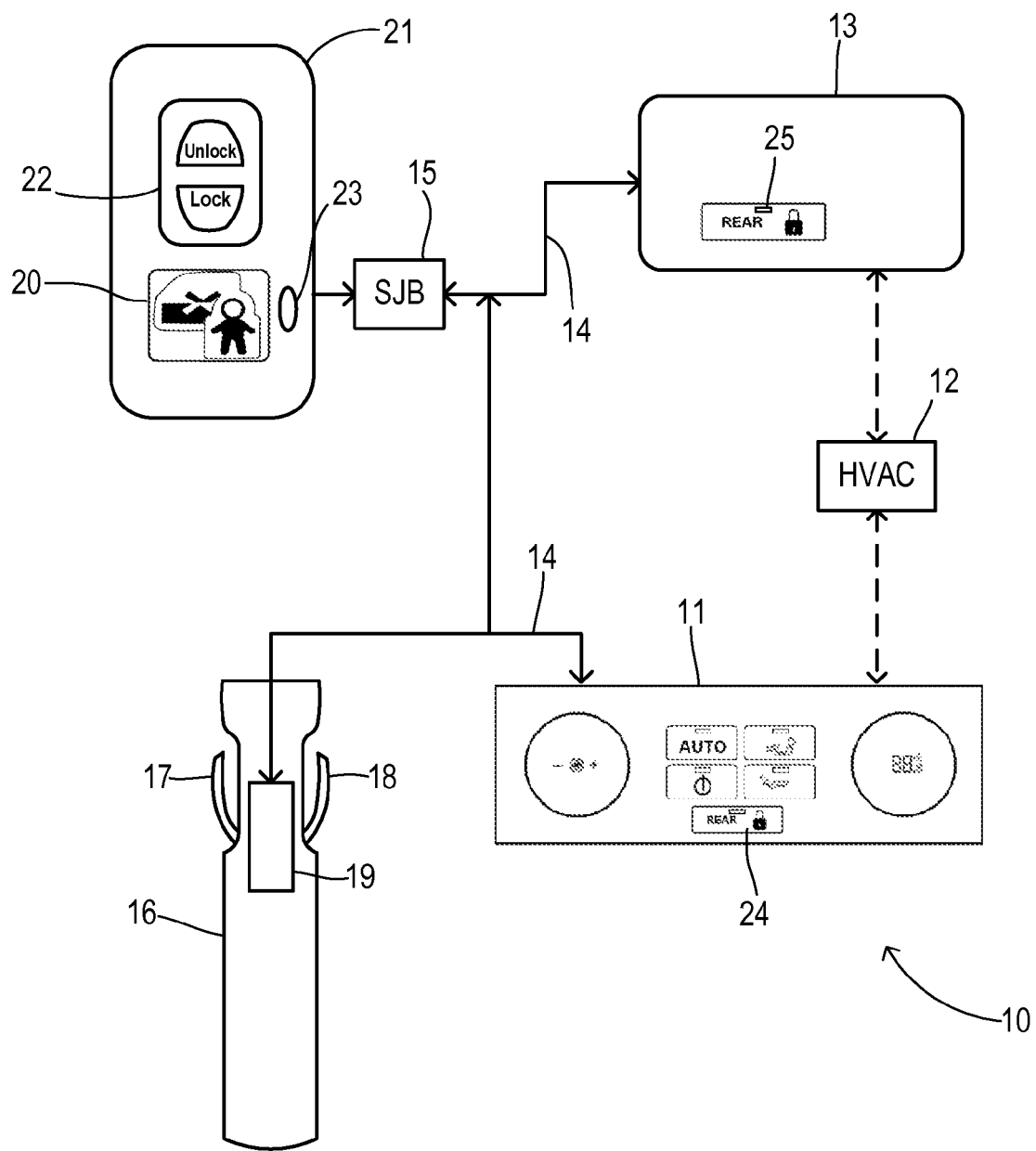
FIG. 1 shows a schematic view of a vehicle including a rear air-conditioning unit and a child lock pushbutton key in one embodiment of the invention.

FIG. 1 illustrates several elements of a vehicle 10 including a rear auxiliary air-conditioning control panel 11 for adjusting various setting of a heating, ventilating, air-conditioning (HVAC) system 12 (such as heating or cooling temperatures, blower fan speed, and blower outlet selections). Panel 11 is installed in the region of the rear passengers in a passenger car. A master control panel 13 is installed in the front seat region of the passenger car for use by a driver or front seat passenger to likewise adjust settings of HVAC system 12. HVAC system 12 may be a dedicated auxiliary system or may be comprised of a portion of a shared system dedicated to the rear passenger area. HVAC system 12 is typically connected to just one of control panels 11 or 13. Control signals from the control panel that is not connected directly to HVAC system 12 are transmitted via the other control panel. Control panels 11 and 13 communicate over a multiplex bus system 14.

Control panels 11 and 13 may also communicate with a smart junction box 15 or other body electronic modules via bus 14. Thus, HVAC system 12 can also be controlled in response to the status of other components in the vehicle, such as a child door lock system.

A rear entry door 16 has an outside door handle 17 and an inside door handle 18. An electronically-controlled latch 19 can be placed in i) a child locked state wherein inside handle 18 is inactivated (so that door 16 can only be opened using outside handle 17—provided that door 16 is not fully locked), and ii) a child unlocked state wherein inside handle 18 works to open door 16 in the same manner as outside handle 17. A child-lock control element or pushbutton key 20 is provided on an operator switch panel 21, typically located on an armrest of a driver's door. In addition to setting latch 19 into the child-locked state, power windows (not shown) on door 16 may also become unpowered when control element 20 is activated. Other control switches on panel 21 may include conventional door lock buttons 22. A display indicator light 23 may be included on panel 21 to be illuminated when element 20 is activated. The child-lock control element could also be located on a vehicle instrument panel as part of a media system, a navigation system, or a standalone element.

The child protection pushbutton key 20 is coupled to rear air-conditioning control panel 11 via either SJB 15 and bus 14 as shown or directly by a dedicated line (not shown). The child protection function is activated by depressing key 20, control panel 11 is switched to a functionless or defeated state (i.e., locked).

In order to display the status of rear air-conditioning control panel 11, a corresponding display 24 (e.g., with a text or icon label and an illumination element or LED) is arranged visibly on control panel 11. Likewise, a display element 25 may be provided on master control panel 13 for the same purpose.

Figure 2:
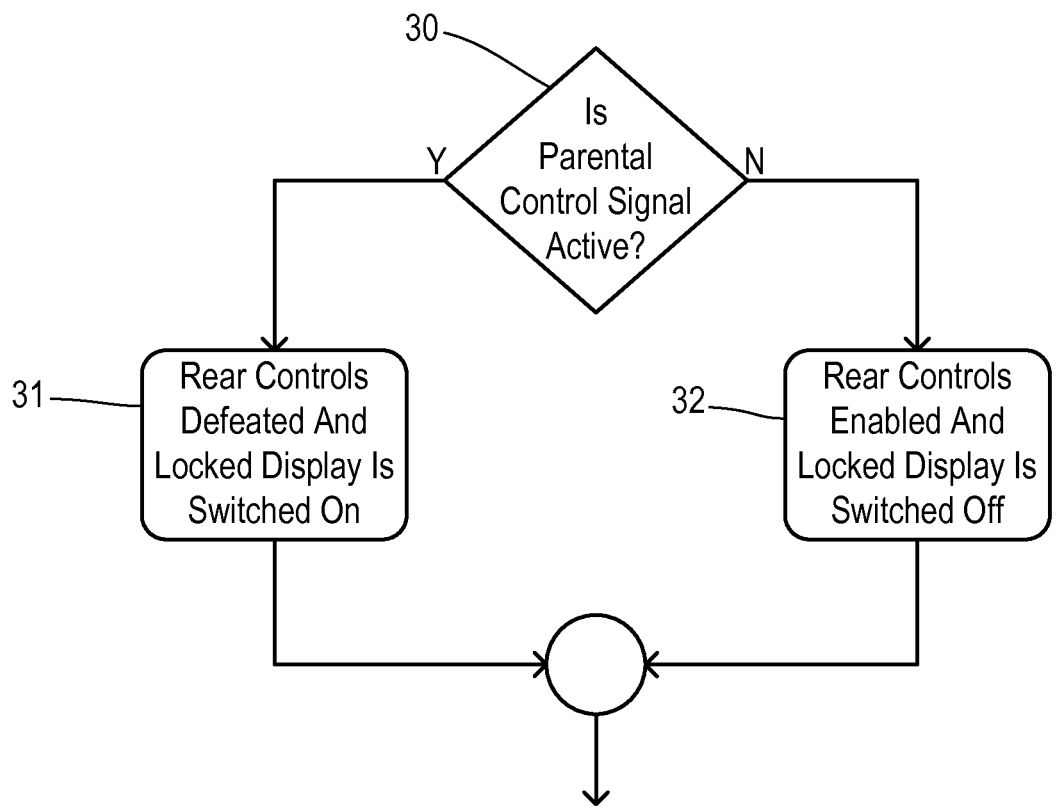
FIG. 2 is a flowchart of one preferred method according to the invention.

FIG. 2 illustrates a flowchart of the method for locking the rear air-conditioning unit by means of the child protection pushbutton key 2. The status of a parental control signal is checked in step 30 by inspecting the position of the lock control element that is accessible from the front seat for setting the child lock state. If this is pressed, that is to say activated, then in step 31 the auxiliary control accessible from the rear seat for adjusting the rear air-conditioning system is switched to a functionless state (i.e., the auxiliary control is selectably defeated). Simultaneously, the indicator for the display is switched on.

In contrast, if the child protection pushbutton key is not pressed, that is to say the child protection function is deactivated, then in step 32 the auxiliary control is switched to an enabled state and the display indicator is switched off.

What is claimed is:

1. A vehicle having front and rear seats, comprising:
   an air conditioning system;
   an auxiliary control accessible from the rear seat for adjusting the air conditioning system temperature;
   a rear entry door having a child locked state and a child unlocked state; and
   a lock control element accessible from the front seat for setting the child locked state;
   wherein the lock control element is coupled to the air conditioning system for selectably defeating the auxiliary control.

2. The vehicle of claim 1 wherein the auxiliary control is defeated when the rear entry door is in the child locked state, and wherein the auxiliary control is not defeated when the rear entry door is in the child unlocked state.

3. The vehicle of claim 1 wherein the auxiliary control is comprised of a rear panel, and wherein the rear panel includes an indicator for displaying whether the auxiliary control is defeated.

4. The vehicle of claim 1 wherein the air conditioning system includes a master control panel accessible from the front seat.

5. The vehicle of claim 4 wherein the master control panel includes an indicator for displaying whether the auxiliary control is defeated.

6. A vehicle comprising:
   a climate system with a master control and an auxiliary control accessible at front and rear seats, respectively;
   a rear entry door lock having a child-locked and child-unlocked states; and
   a lock control element accessible from the front seat for setting the lock state;
   wherein the lock control element is coupled to the climate system to defeat temperature adjustment commands from the auxiliary control when in the child locked state.

7. The vehicle of claim 6 wherein the setting of the lock control element is coupled to the auxiliary control, wherein adjustment commands are transmitted from the auxiliary control to the climate system when the lock state is set to the child unlocked state, and wherein transmitting of the adjustment commands is defeated when the lock state is set to the child locked state.

8. A method comprising the steps of:
   setting a lock control element from a front seat of a vehicle to select between a child locked state and a child unlocked state of a rear entry door of the vehicle;
   coupling the setting of the lock control element to a rear seat air conditioning unit;
   transmitting temperature adjustment commands from a rear seat auxiliary control to the rear seat air conditioning unit when the rear entry door is set to the child unlocked state; and
   defeating the temperature adjustment commands when the rear entry door is set to the child locked state.

9. The method of claim 8 further comprising the step of illuminating a display indicator according to whether the adjustment commands are being defeated.

* * * * *